United States Patent
Mars et al.

(10) Patent No.: US 12,259,918 B2
(45) Date of Patent: Mar. 25, 2025

(54) SYSTEMS AND METHODS FOR COLLECTING AND PROCESSING MEMORY-RELATED DATA AND SYNTHESIZING MEMORY-BASED NARRATIVES

(71) Applicant: TOBU Corporation, Scottsdale, AZ (US)

(72) Inventors: Jason Mars, Ann Arbor, MI (US); Eldon Marks, Georgetown (GY); Patrick Mclaughlin, Los Angeles, CA (US)

(73) Assignee: TOBU Corporation, Scottsdale, AZ (US)

( * ) Notice: Subject to any disclaimer, the term of this patent is extended or adjusted under 35 U.S.C. 154(b) by 0 days.

(21) Appl. No.: 18/640,779

(22) Filed: Apr. 19, 2024

(65) Prior Publication Data
US 2024/0362260 A1    Oct. 31, 2024

Related U.S. Application Data

(60) Provisional application No. 63/462,072, filed on Apr. 26, 2023.

(51) Int. Cl.
| | |
|---|---|
| *G06F 16/34* | (2025.01) |
| *G06F 3/16* | (2006.01) |
| *G06F 16/36* | (2019.01) |
| *G06F 16/901* | (2019.01) |
| *G06F 40/284* | (2020.01) |
| *G06T 11/20* | (2006.01) |

(52) U.S. Cl.
CPC ........... *G06F 16/345* (2019.01); *G06F 3/167* (2013.01); *G06F 16/367* (2019.01); *G06F 16/9024* (2019.01); *G06F 40/284* (2020.01); *G06T 11/206* (2013.01)

(58) Field of Classification Search
CPC ....... G06F 16/36; G06F 16/367; G10L 15/22; G10L 15/222; G10L 15/225
See application file for complete search history.

(56) References Cited

U.S. PATENT DOCUMENTS

| | | | | |
|---|---|---|---|---|
| 2010/0070448 | A1* | 3/2010 | Omoigui | H01L 27/1463 706/55 |
| 2011/0238409 | A1* | 9/2011 | Larcheveque | G10L 15/1815 704/239 |
| 2020/0410012 | A1* | 12/2020 | Moon | G06Q 10/04 |
| 2021/0192144 | A1* | 6/2021 | Paley | G06F 40/56 |
| 2021/0248136 | A1* | 8/2021 | Panuganty | G06F 16/972 |
| 2022/0374110 | A1* | 11/2022 | Ramaswamy | G06F 3/0482 |

(Continued)

*Primary Examiner* — Michael N Opsasnick
(74) *Attorney, Agent, or Firm* — Padowithz Alce; Alce PLLC

(57) ABSTRACT

Systems and methods for collecting and processing memory-related data and synthesizing memory-based narratives that includes collecting memory input data from one or more users, constructing a memory graph comprising a hierarchical data structure including one or more graphical nodes for storing the memory input data, assimilating the memory graph into a semantic collage of distinct memory graphs, generating a mnemonic narrative artifact comprising memory input data from related memory graphs, and surfacing the mnemonic narrative artifact via a user interface to one or more users.

15 Claims, 4 Drawing Sheets

(56) References Cited

U.S. PATENT DOCUMENTS

| | | | |
|---|---|---|---|
| 2023/0088445 A1* | 3/2023 | Liu .................... | G10L 15/1815 704/232 |
| 2023/0110941 A1* | 4/2023 | Makhija ................ | G06F 40/284 709/224 |

* cited by examiner

200

Collecting Primary Image Input Data S205

Collecting Conversational Memory Input Data S210

Constructing a Dynamic Memory Graph S220

Assimilating the Dynamic Memory Graph into a Semantic Nexus S230

Synthesizing a Mnemonic Narrative S240

Deploying the Mnemonic Narrative S250

FIGURE 2

SYSTEMS AND METHODS FOR COLLECTING AND PROCESSING MEMORY-RELATED DATA AND SYNTHESIZING MEMORY-BASED NARRATIVES

CROSS-REFERENCE TO RELATED APPLICATIONS

This application claims the benefit of U.S. Provisional Patent Application No. 63/462,072, filed 26 Apr. 2023, which is incorporated in its entirety by this reference.

TECHNICAL FIELD

The inventions herein relate generally to the natural language recording and processing field, and more specifically to a new and useful system and method for collecting and processing memory-related data in the natural language recording and processing field.

BACKGROUND

Contemporary means for the recording, preserving, and storing of personal histories and memories utilize a variety of disparate technologies such as photo sharing and storing applications, journaling software, and audio recording systems. Users may typically need to use or employ a wide variety of such technologies to adequately capture personal memories and experiences, and often such technology may have cumbersome or unintuitive input methods. Furthermore, such modern memory-preserving technologies commonly function to merely store or record data related to memories and experiences, leaving users themselves to sort through past recorded information.

Therefore, there is a need in the memory-recording field to create improved systems and methods for intelligently recording, storing, and analyzing personal memories. The embodiments of the present application described herein provide technical solutions that address, at least, the needs described above, as well as the deficiencies of the state of the art.

BRIEF SUMMARY OF THE INVENTION(S)

In one embodiment, a computer-implemented method of structuring and retrieving user-input memory-related data includes: obtaining, via a user interface, memory input data from one or more users, wherein the memory input data comprises a digital media artifact and one or more pieces of memory-descriptive data that is descriptive of a target user-recalled memory associated with the digital media artifact; automatically constructing, by one or more processors, a target memory graph based on the collected memory input data, wherein the target memory graph comprises a plurality of graphical nodes representing a semantic illustration of the memory input data; creating, by the one or more processors, a semantic collage using the target memory graph, wherein: the semantic collage comprises a plurality of distinct memory graphs interconnected via one or more graphical connections, creating the semantic collage includes setting at least one semantic nexus between a node of the target memory graph and a node of a historical memory graph of the semantic collage, the at least one semantic nexus relates to a graphical connection that connects nodes of the target memory graph and the historical memory graph that have an identified semantic relationship, and generating, via a machine learning model, a mnemonic narrative artifact based the semantic collage, wherein the mnemonic narrative comprises a semantic summarization of the semantic collage that is synthesized using data extracted from the semantic collage; and storing, in a queryable computer database, the mnemonic narrative artifact in digital association with the semantic collage and the digital media artifact, wherein if a semantic search of the queryable computer database identifies the semantic collage or the mnemonic narrative artifact, returning via a user interface one or more of the digital media artifact and the mnemonic narrative artifact.

In one embodiment, a computer-implemented method of structuring and retrieving user-input memory-related data includes collecting, via a user interface, memory input data from one or more users, wherein the memory input data comprises one or more pieces of memory-descriptive data that is descriptive of a target user-recalled memory; automatically constructing a target memory graph based on the memory input data, wherein the target memory graph comprises a hierarchical graphical data structure including one or more graphical nodes for storing the memory input data; assimilating the target memory graph into a semantic nexus, wherein the semantic nexus comprises a plurality of distinct memory graphs, wherein each of the plurality of distinct memory graphs is associated with a distinct user-recalled memory of the one or more users; generating a mnemonic narrative artifact based on one or more of the plurality of distinct memory graphs of the semantic nexus, wherein the mnemonic narrative artifact comprises memory input data from each of the one or more of the plurality of distinct memory graphs to represent a history of related user-recalled memories; and surfacing the mnemonic narrative artifact to the one or more users via the user interface.

In one embodiment, automatically constructing the target memory graph includes: (i) extracting one or more semantic data values from the memory input data, wherein each of the one or more semantic data values comprises a value that informs a context of the target user-recalled memory, and (ii) configuring one or more semantic nodes of the target memory graph, wherein each of the one or more semantic nodes comprises one of the one or more extracted semantic data values.

In one embodiment, assimilating the target memory graph into the semantic nexus includes: (i) identifying one or more pairs of matching semantic nodes, each pair of matching semantic nodes comprising one semantic node from the target memory graph and one semantic node from another memory graph of the plurality of distinct memory graphs of the semantic collage, wherein the pairs of matching semantic nodes have semantic data values that satisfy a matching criterion; and (ii) configuring one or more semantic nexus edges linking the semantic nodes in each pair of matching semantic nodes.

In one embodiment, the matching criterion includes computing a distance between embedding values of the one semantic node from the target memory graph and the one semantic node from the another memory graph of the plurality of distinct memory graphs. In such embodiments, if the computed distance between the embedding values satisfies or is less than a matching distance threshold, then matching criterion is satisfied.

In one embodiment, extracting the one or more semantic data values from the memory input data includes identifying a distinct semantic type for each of the one or more extracted semantic data values.

In one embodiment, collecting memory input data from the one or more users includes collecting one or more user utterances via the user interface, and automatically constructing the target memory graph includes automatically configuring one or more conversational flow nodes of the target memory graph, wherein each of the conversational flow nodes comprises one or more of the collected user utterances.

In one embodiment, automatically constructing the target memory graph includes automatically constructing one or more conversational flow edges, wherein each conversational flow edge links two distinct conversational flow nodes of the target memory graph, wherein the conversational flow nodes and conversational flow edges represent a chronological sequence of user utterances from the one or more users.

In one embodiment, automatically constructing the target memory graph includes: (i) providing, as input, one or more user utterances stored in the one or more conversational flow nodes to a semantic data extraction model, (ii) receiving, as output from the semantic data extraction model, one or more semantic tokens extracted from the one or more user utterances input to the semantic extraction model, and (iii) constructing one or more semantic nodes of the target memory graph, wherein each semantic node stores at least one of the one or more extracted semantic tokens.

In one embodiment, automatically constructing the target memory graph includes configuring one or more semantic edges of the target memory graph, wherein each of the one or more semantic edges links a distinct semantic node to a corresponding conversational flow node.

In one embodiment, assimilating the target memory graph into the semantic nexus is contemporaneous with constructing the target memory graph.

In one embodiment, assimilating the target memory graph into the semantic nexus is contemporaneous with collecting the memory input data from the one or more users.

In one embodiment, automatically constructing the target memory graph is contemporaneous with collecting the memory input data from the one or more users.

In one embodiment, constructing the target memory graph includes: extracting one or more sets of one or more tokens from the memory input data; generating, via the machine learning model, contextual metadata for each distinct set of the one or more sets of one or more tokens based on an input of the one or more sets of one or more tokens; configuring one or more semantic nodes of the plurality of graphical nodes of the target memory graph based on: assigning each distinct set of one or more tokens of the one or more sets to each of the one or more semantic nodes, and appending each contextual metadata for each distinct set of one or more tokens to a respective node of the one or more semantic nodes based on the assignment of each distinct set of one or more tokens.

In one embodiment, a computer-implemented method of structuring and retrieving user-input memory-related data includes receiving, via a user interface, a memory artifact from one or more users comprising one or more data objects related to a target user memory, collecting, via a user interface, memory context data from the one or more users, wherein the memory context data comprises one or more utterances associated with the one or more memory artifacts or the target user memory; automatically constructing a target memory graph based on the one or more memory artifacts and the memory context data, wherein constructing the target memory graph comprises: (i) configuring one or more utterance nodes of the target memory graph for storing the memory context data, and (ii) configuring one or more semantic nodes of the target memory graph for storing semantic tokens extracted from the memory context data; assimilating the target memory graph into a semantic nexus comprising a plurality of distinct memory graphs; generating a mnemonic narrative artifact based on one or more of the plurality of distinct memory graphs of the semantic nexus, wherein the mnemonic narrative artifact comprises memory context data from each of the one or more of the plurality of distinct memory graphs to represent a history of related user-recalled memories; and surfacing the mnemonic narrative artifact to the one or more users via the user interface.

In one embodiment, assimilating the memory graph includes automatically searching the semantic nexus for one or more matching memory graphs of the plurality of distinct memory graphs of the semantic nexus, wherein the matching memory graphs include semantic tokens that match semantic tokens of the target memory graph.

In one embodiment, (i) assimilating the target memory graph occurs contemporaneously relative to constructing the target memory graph in a limited operational mode, wherein the limited operational mode restricts automatically searching the semantic nexus for one or more matching memory graphs to a number N of the plurality of distinct memory graphs of the semantic nexus, and (ii) assimilating the target memory graph occurs asynchronously relative to constructing the target memory graph in a non-limited operational mode, wherein the non-limited operational mode does not restrict automatically searching the semantic nexus for one or more matching memory graphs to a number N of the plurality of distinct memory graphs of the semantic nexus.

In one embodiment, generating the mnemonic narrative includes configuring the mnemonic narrative with natural language textual data generated based on the memory context data from the matching memory graphs and the target memory graph.

In one embodiment, automatically constructing the target memory graph is contemporaneous relative to the collecting of memory context data.

In one embodiment, automatically constructing the target memory graph includes automatically constructing one or more conversational flow edges, wherein each conversational flow edge links two distinct utterance nodes, wherein the utterance nodes and conversational flow edges represent a conversational flow sequence of user utterances of the one or more users.

In one embodiment, configuring the one or more semantic nodes includes: providing, as input, one or more user utterances stored in the one or more utterance nodes to a semantic data extraction model, receiving, as output from the semantic data extraction model, the one or more semantic tokens extracted from the one or more user utterances input to the semantic extraction model, and configuring a semantic node for storing each extracted semantic token.

In one embodiment, automatically constructing the target memory graph includes configuring one or more semantic edges of the memory graph, wherein each semantic edge links a distinct semantic node to an associated utterance node.

In one embodiment, a computer-implemented system of structuring and retrieving user-input memory-related data includes: one or more processors, a user interface, a queryable computer database, a computer-readable medium operably coupled to the one or more processors, the computer-readable medium having computer-readable instructions stored thereon that, when executed by the one or more processors, cause a computing device to perform operations including: obtaining, via the user interface, memory input data from one or more users, wherein the memory input data comprises a digital media artifact and one or more pieces of memory-descriptive data that is descriptive of a target user-recalled memory associated with the digital media artifact; automatically constructing a target memory graph based on the collected memory input data, wherein the target memory graph comprises a plurality of graphical nodes representing a semantic illustration of the memory input data; creating, by the one or more processors, a semantic collage using the target memory graph, wherein: the semantic collage comprises a plurality of distinct memory graphs interconnected via one or more graphical connections, creating the semantic collage includes setting at least one semantic nexus between a node of the target memory graph and a node of a historical memory graph of the semantic collage, the at least one semantic nexus relates to a graphical connection that connects nodes of the target memory graph and the historical memory graph that have an identified semantic relationship, and generating, via a machine learning model, a mnemonic narrative artifact based the semantic collage, wherein the mnemonic narrative comprises a semantic summarization of the semantic collage that is synthesized using data extracted from the semantic collage; and storing, in the queryable computer database, the mnemonic narrative artifact in digital association with the semantic collage and the digital media artifact, wherein if a semantic search of the queryable computer database identifies the semantic collage or the mnemonic narrative artifact, returning via a user interface one or more of the digital media artifact and the mnemonic narrative artifact.

BRIEF DESCRIPTION OF THE FIGURES

FIG. 2 illustrates an example method 200 in accordance with one or more embodiments of the present application;

DESCRIPTION OF THE PREFERRED EMBODIMENTS

The following description of the preferred embodiments of the present application are not intended to limit the inventions to these preferred embodiments, but rather to enable any person skilled in the art to make and use these inventions.

Figure 1:
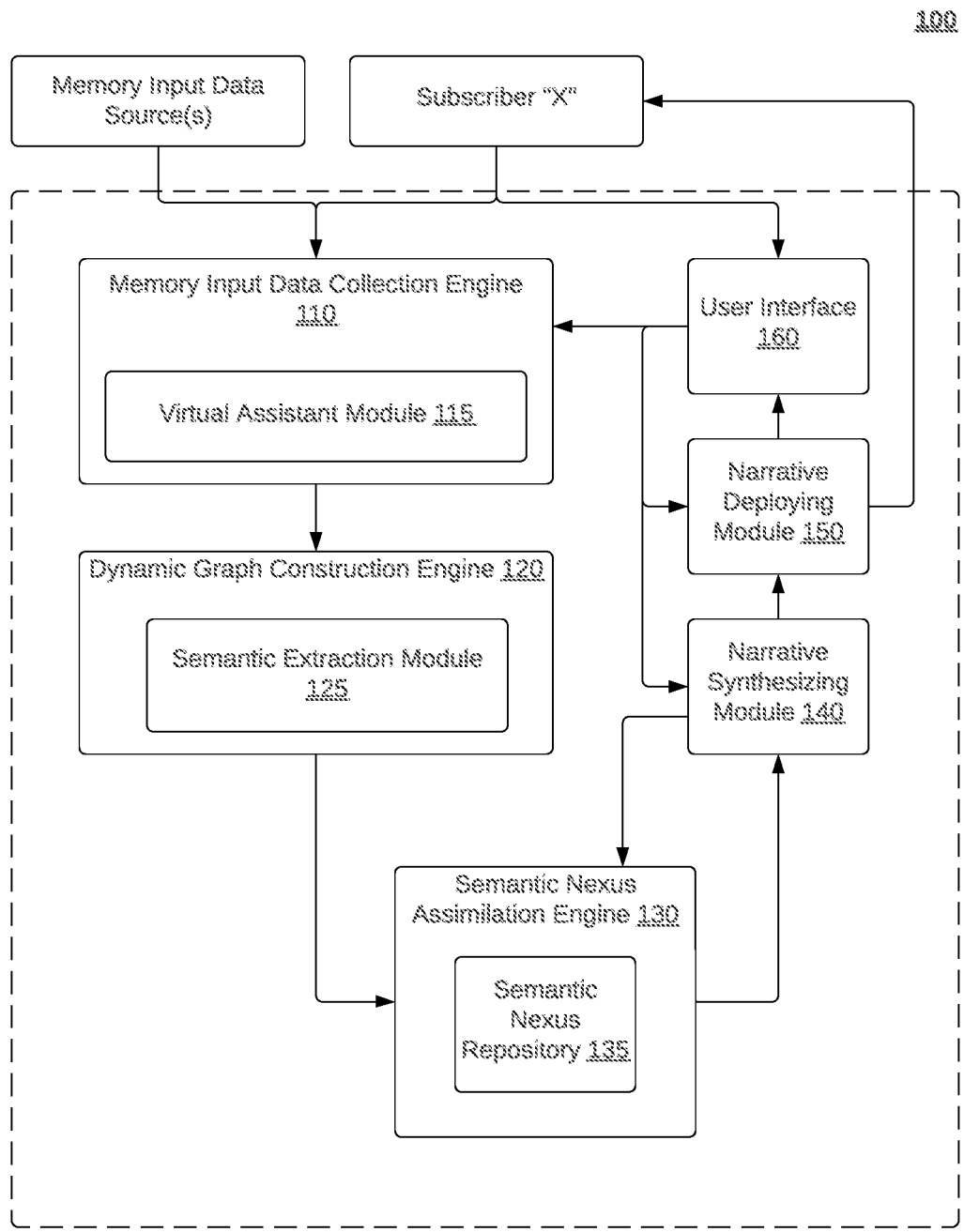
FIG. 1 illustrates a schematic representation of a system 100 in accordance with one or more embodiments of the present application.

1. System for Collecting and Processing Memory-Related Data and Synthesizing Memory-Based Narratives As shown in FIG. 1, a system 100 for collecting and processing memory-related data and synthesizing memory-based narratives includes a memory input data collection engine 110, a dynamic graph construction engine 120, a semantic nexus assimilation engine 130, a narrative synthesizing module 140, and a narrative deploying module 150. Additionally, the system 100 may include a semantic nexus repository 135, a user interface 160, a virtual assistant module 115, and/or a semantic extraction module 125.

1.10 Memory Input Collection Engine

The memory input data collection engine 110, which may sometimes be referred to herein as an "input collection engine" 110, preferably functions to collect or receive memory input data related to one or more memory instances. As generally referred to herein, a memory instance may relate to a particular memory of a user or subscriber which may be defined or represented by memory input data (as detailed in 2.1). Preferably, the input collection engine 110 may be in operable communication with one or more users or subscribers via a user interface or the like (e.g., user interface 160), wherein the one or more users or subscribers may provide memory input data to input collection engine 110. Additionally, or alternatively, the input collection engine 110 may be in operable communication with one or more sources of memory input data, wherein the one or more sources of memory input data, which may include, but are not limited to, textual data sources, audio data sources, streaming or real-time data sources, external data repositories or archives, and/or any suitable source of input data or combination thereof.

1.15 Virtual Assistant Module

In some embodiments, memory input data collection engine 110 may include virtual assistant module 115. In such embodiments, virtual assistant module 115 may function to construct and implement a virtual conversational assistant which may in turn interact with one or more users or subscribers via a user interface (e.g., user interface 160) in a virtual dialogue or conversation. In some such embodiments, virtual assistant module 115 may employ one or more machine learning algorithms, one or more ensembles of trained machine learning models, and/or one or more heuristic- or rule-based algorithms suitable for implementing a natural language virtual conversational assistant.

1.20 Dynamic Graph Construction Engine

The dynamic graph construction engine 120, which may sometimes be referred to herein as a "graph construction engine" 120, preferably functions to dynamically construct and/or modify a graphical data structure for representing and storing memory input data. In some embodiments, graph construction engine 120 may operate concurrently or contemporaneously with memory input data collection engine 110.

1.25 Semantic Extraction Module

In some embodiments, graph construction engine 120 may include semantic extraction module 125. In such embodiments, semantic extraction module 125 may function to extract semantic data from the collected memory input data (as described in 2.2). Additionally, or alternatively, semantic extraction module 125 may function to extract semantic data from the dynamic memory graph, and/or semantic extraction module 125 may function to configure or modify the dynamic memory graph based on extracted semantic data.

In some embodiments, semantic extraction module 125 may implement one or more machine learning algorithms and/or one or more ensembles of trained machine learning models. In such embodiments, semantic extraction module 125 may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFIT, XLM UDify, MT-DNN, SpanBERT, ROBERTa, XLNet, ERNIE, KnowBERT, VideoBERT, ERNIE BERT-wwm, Mobile-BERT, TinyBERT, GPT, GPT-2, GPT-3, GPT-4 (and all subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

1.30 Nexus Assimilation Engine

The semantic nexus assimilation engine 130, which may sometimes be referred to herein as an "assimilation engine" 130, preferably functions to assimilate or integrate one or more memory graphs into a semantic nexus of one or more interconnected memory graphs (as described in 2.3). In one or more embodiments, assimilation engine 130 may be in operable communication with dynamic graph construction engine 120. In such embodiments, assimilation engine 130 may function to assimilate or integrate the dynamic memory graph constructed by graph construction engine 120 into the semantic nexus. In some such embodiments, assimilation engine 130 may operate concurrently or contemporaneously with graph construction engine 120.

1.35 Semantic Nexus Repository

In some embodiments, semantic nexus assimilation engine 130 may include semantic nexus repository 135, sometimes referred to herein as a "nexus repository" 135. In such embodiments, nexus repository 135 may function to store one or more semantic nexuses of interconnected memory graphs, and/or nexus repository 135 may function to store one or more memory graphs in system 100. In one or more embodiments, nexus repository 135 may be queried by one or more components of system 100 to provide access to the stored semantic nexus and/or the one or more stored memory graphs. In some embodiments, system 100 may include a plurality of nexus repositories 135.

1.40 Narrative Synthesizing Module

The narrative synthesizing module 140, sometimes referred to herein as a "narrative synthesizer" 140, preferably functions to synthesize or construct a mnemonic narrative based on semantically related memory graphs in the semantic nexus (as described in 2.4). In some preferred embodiments, narrative synthesizer 140 may function to synthesize or construct a natural language mnemonic narrative suitable for output to a user or subscriber of system 100. In one or more embodiments, narrative synthesizer 140 may be in operable communication with assimilation engine 130 and/or nexus repository 135 to process or analyze one or more semantic nexuses of system 100. In some such embodiments, narrative synthesizer 140 may additionally or alternatively function to output the synthesized narrative to assimilation engine 130 and/or nexus repository 135 for storage of the synthesized narrative. In some embodiments, narrative synthesizer 140 may receive input from one or more users or subscribers of system 100 (e.g., via user interface 160) to initiate, direct, or configure narrative synthesizer 140.

1.50 Narrative Deploying Module

The narrative deploying module 150 preferably functions to output or deploy one or more synthesized mnemonic narratives. In one or more embodiments, narrative deploying module 150 may receive an input of a synthesized narrative from one or more of narrative synthesizer 140, assimilation engine 130, and/or nexus repository 135. In one or more embodiments, narrative deploying module 150 may function to output or deploy the one or more synthesized mnemonic narratives to a user interface (e.g., user interface 160) and/or directly to a user or subscriber of system 100. In some embodiments, narrative deploying module 150 may function to receive input from a user interface (e.g., user interface 160) to initiate, direct, or configure narrative deploying module 150.

1.60 User Interface

The user interface 160 may function to enable one or more users or subscribers of system 100 to initiate, direct, and/or configure one or more components of system 100. User interface 160 may function to receive user input and/or provide output to the one or more users or subscribers. Accordingly, in one or more embodiments, a user or subscriber may interact with system 100 via user interface 160 to perform functions including, but not limited to, providing memory input data, configuring the construction of a mnemonic narrative, and receiving a mnemonic narrative deployed by system 100. User interface 160 may implement a graphical user interface (GUI), voice user interface (VUI), or any other suitable interface for receiving input from and providing output to one or more users or subscribers of system 100.

2. Method for Collecting and Processing Memory-Related Data and Synthesizing Memory-Based Narratives As shown in FIG. 2, a method 200 for collecting and processing memory-related data and synthesizing memory-based narratives may include collecting conversational memory input data S210, constructing a dynamic memory graph S220, assimilating the dynamic memory graph into a semantic nexus S230, synthesizing a mnemonic narrative S240, and deploying the mnemonic narrative S250. Additionally, in some preferred embodiments, method 200 may include collecting primary memory image input data S205.

2.05 Collecting Primary Memory Image Input Data

In some preferred embodiments, method 200 may include S205, which includes collecting primary memory image input data or primary memory artifact input data. Preferably, S205 may function to receive or collect primary memory image input data or primary memory artifact input data from one or more subscribers or users of a system implementing method 200. Primary memory image input data (sometimes referred to herein as primary memory image(s)), as used herein, may refer to one or more images or image files that may relate to one or more memories to be stored and analyzed by method 200. Primary memory artifact input data (sometimes referred to herein as primary memory artifact(s)), as used herein, may refer to images or image data, video data files, digital images, digital documents (e.g., digital letters or images of letters or documents, etc.) and/or any suitable media files or data that may relate to one or more memories to be stored and analyzed by method 200. In various embodiments, the one or more memories may be memories of one or more users or subscribers, and may relate to one or more past experiences, events, and/or the like that may be recalled by the one or more users or subscribers. In some such embodiments, the collecting of primary memory image input data or primary memory artifact data may function to initialize method 200. For example, a user may input (e.g., upload) an image to a system implementing method 200, and in turn the system may initialize method 200 to collect and receive memory input data (as described in 2.1) related to one or more memories represented by the input image. Additionally, or alternatively, S205 may implement a user interface including one or more controls that may function to initialize method 200; in some such embodiments, primary memory image input data or primary memory artifact data may not be collected and/or utilized.

2.10 Collecting Conversational Memory Input Data

S210, which includes collecting conversational memory input data, may function to receive an input of memory input data from one or more users. As used herein, memory input data (sometimes referred to herein as memory context data) may refer to user- or subscriber-input data related to or descriptive of one or more memory instances or memories. In one or more embodiments the memory input data may include, but is not limited to, textual input, audio input, speech utterance input, image input, or any other suitable type of input or combination thereof. Preferably, the memory input data may be input in the form of utterances (textual, audio, and/or other speech utterance input data formats). In some embodiments, the memory input data may include the primary memory image input data and/or the primary memory artifacts (as discussed in 2.05), and/or one or more pieces of data that describes and/or contextualizes the primary memory image input data and/or the primary memory artifacts. In a preferred embodiment, user input may be collected in a conversation between one or more users and an intelligent virtual conversational assistant or a chatbot. Additionally, or alternatively, in some embodiments, user input may be collected through a user interface or other suitable means for receiving user input data in a non-assisted mode (i.e., without use of the virtual conversational assistant).

Virtual Conversational Assistant

In a preferred embodiment, the memory input data may be collected or received in a conversation or dialogue between one or more users and an intelligent virtual conversational assistant. The virtual conversational assistant may function to interact with one or more users or subscribers in a natural language conversation or dialogue to collect user input (memory input data) related to a target or specific memory instance. In some such embodiments, a conversation or dialogue between the one or more users and the virtual conversational assistant may include one or more conversation turns, wherein each conversation turn may include a user input, query, and/or response, and a virtual conversational assistant response and/or prompt. For example, a conversation turn may include a virtual conversational assistant textual prompt output to a user to request that the user describe a target memory, and a collection of user speech utterances from the user in response describing the target memory. In some embodiments, a conversation turn may include one or more follow-up prompts or inquiries output by the virtual conversational assistant, and one or more follow-up responses input by the one or more users.

In such embodiments, S210 may function to implement the virtual conversational assistant using one or more suitable machine learning models for natural language processing (e.g., large language models) and/or one or more heuristic- or rule-based algorithms. The virtual conversational assistant may process user input in the form of user speech utterances, textual input, audio input, or any other suitable user input format or combination thereof. The virtual conversational assistant may output one or more prompts or responses to the one or more users in the form of textual output (e.g., textual prompts, natural language textual responses, etc.), audio output (e.g., synthetic speech), or any other suitable format or combination thereof.

User Input and User Interface

S210 may function to receive user input in one or more formats including textual input, audio input, speech utterance input, image input, or any other suitable type of input or combination thereof. In embodiments wherein S210 receives user audio input (e.g., audio speech utterances), S210 may function to process the audio input using audio speech recognition to convert the audio data into textual data.

Preferably, S210 may function to receive memory input data via a user interface. In some embodiments, the user interface may include a graphical user interface (GUI), and may include one or more visual or graphical components that may function to perform one or more actions including, but not limited to: receiving user input (e.g., text input fields or boxes, or the like), controlling user input (e.g., buttons for starting, pausing, or ending user input), and/or responding to user input (e.g., text boxes, dialogue windows, or prompts). Additionally, or alternatively, the user interface may include a voice user interface (VUI) that may function to receive memory input data in audio formats and/or interact with one or more users via synthetically generated speech and/or audio cues. The user interface may be implemented via any suitable computing device and/or form, including, but not limited to, via a mobile computing device, via a web browser, via a social network interface, via wearable computing devices (e.g., smart watches, smart glasses, and/or the like), virtual and/or personal assistant devices (e.g., Alexa, Amazon Echo, Google Home, Cortana, Jarvis, etc.), and/or the like. In embodiments wherein S210 implements the virtual conversational assistant, the one or more users may interact with the virtual conversational assistant via the GUI, the VUI, or a combination thereof.

Additionally, or alternatively, in some embodiments S210 may function to receive memory input data from one or more sources of memory input data or one or more corpora of memory input data. In such embodiments, the one or more sources or corpora of memory input data may include, but are not limited to, textual data sources, audio data sources, and/or the like. Additionally, such sources of memory input data may include, but are not limited to, memory input data repositories, streaming or real-time data sources, external data sources, and/or any suitable source of memory input data or combination thereof.

2.20 Constructing a Dynamic Memory Graph

Figure 3:
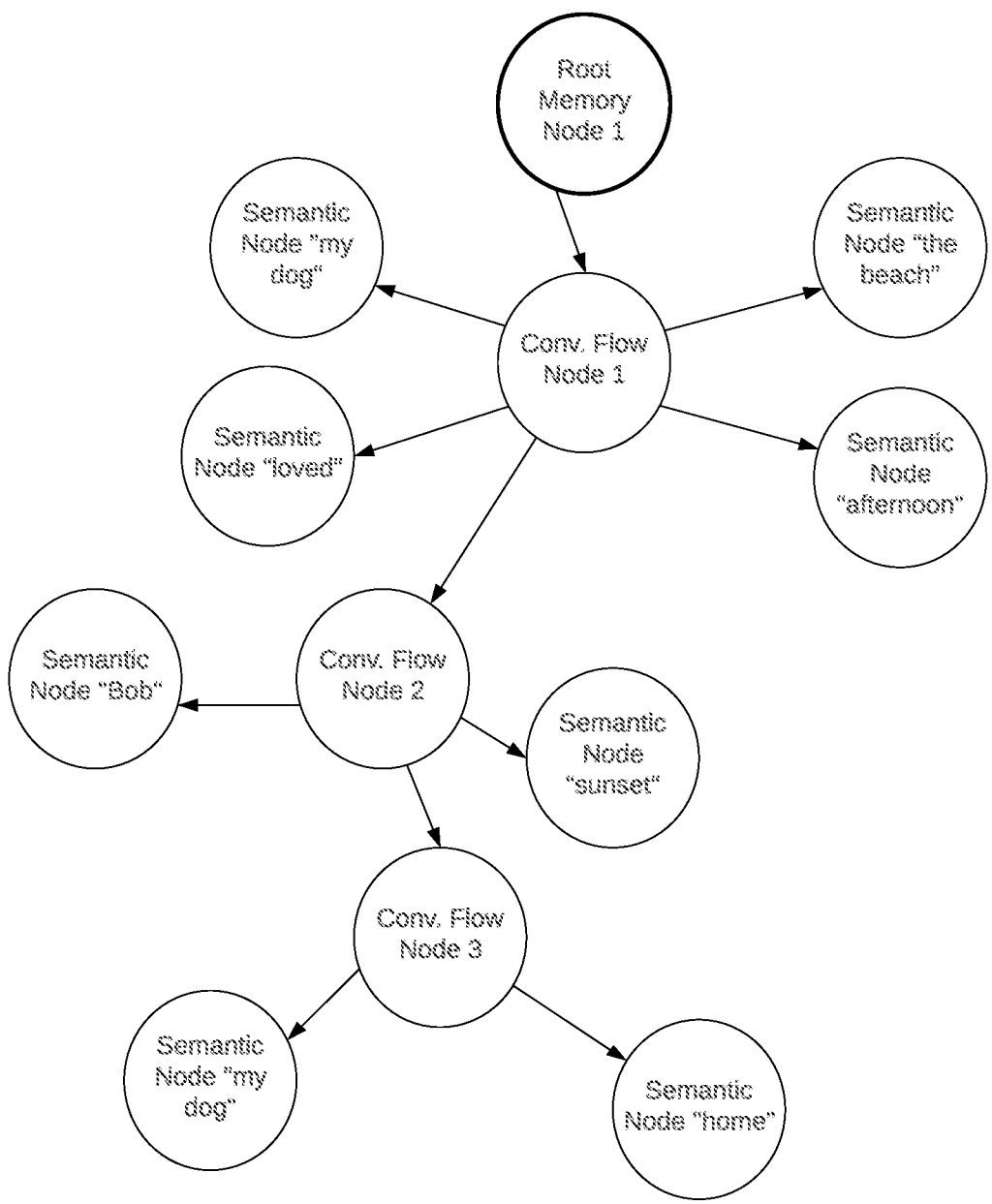
FIG. 3 illustrates a schematic representation of an example memory graph in accordance with one or more embodiments of the present application.

S220, which includes constructing a dynamic memory graph, may function to construct a dynamic memory graph based on the collected memory data. A dynamic memory graph, as used herein, may refer to a hierarchical graphical data structure for dynamically representing and/or storing the memory input data. In some preferred embodiments, the dynamic memory graph may include one or more graphical nodes and one or more graphical edges, as shown in FIG. 3. Preferably, a graphical node may function to store one or more instances of memory input data and/or one or more pieces of data derived from the collected memory data, and a graphical edge may function to connect one or more related graphical nodes. In a preferred embodiment, the constructing of the memory graph may occur dynamically, such that the memory graph may be constructed or modified as memory input data is received. That is, in such a preferred embodiment, S220 may be concurrent or contemporaneous relative to S210. In an alternative embodiment, the constructing of the memory graph S220 may occur after the collecting of memory input data S210.

In one or more preferred embodiments, the one or more graphical nodes may include, but are not limited to, memory instance root nodes, conversational flow nodes and semantic memory nodes. As used herein, a memory instance root node (sometimes referred to herein as a "root node") may refer to a graphical node that may function as a root node for the dynamic memory graph. As used herein, a conversational flow node may refer to a graphical node that may function as a data structure for storing one or more pieces of conversational memory data (e.g., data from a conversation between one or more users and the virtual conversational assistant, sometimes referred to herein as "conversational data"). As used herein, a semantic memory node may refer to a graphical node that may function as a data structure for storing one or more pieces of semantic memory data that may be extracted from conversation data. As used herein, semantic memory data may refer to data elements (e.g., a group of characters, one or more words or tokens, a segment of conversation data, and/or the like) extracted from conversation data that may have semantic meaning or provide semantic context for a distinct user-recalled memory. For example, a conversation data utterance may include the statement: "I went to the beach"; in such example, each individual word (e.g., "I", "went", "to", "the", and "beach") may be considered as a semantic memory data element (sometimes referred to herein as a "semantic value").

Conversational Flow Nodes

Preferably, S220 may function to construct one or more conversational flow nodes (sometimes referred to as "utterance nodes") for representing or storing memory input data. In some preferred embodiments, S220 may construct one or more conversational flow nodes based on one or more conversation turns between one or more users and the virtual conversational assistant (as described in 2.1). In such an implementation, each conversational flow node may represent a conversation turn in which a dialogue intent changes or a distinct utterance (e.g., a completed statement or query), wherein each conversational flow node may function to store memory input data collected during a respective conversation turn. For example, a conversational flow node may store one or more user utterances input during a conversation turn. Additionally, a conversational flow node may store one or more output statements from the virtual conversational assistant in a conversation turn (e.g., prompts and follow-up inquiries output by the virtual conversational assistant in a conversation turn). Alternatively, in embodiments in which one or more users submit memory input data without the use of the virtual conversational assistant, S220 may function to construct the one or more conversational flow nodes based solely on the collected memory input data.

In some embodiments, S220 may include configuring or constructing one or more graphical conversational flow edges between one or more conversational flow nodes. As referred to herein, a graphical conversational flow edge (sometimes referred to as a "conversational flow edge") may relate to a graphical edge in the dynamic memory graph that may function to connect conversational flow nodes, such that the conversational flow nodes and conversational flow edges represent a conversational flow (e.g., a conversational flow between a user and the virtual conversational assistant). In some such embodiments, conversational flow nodes may be created and/or arranged in a conversational flow sequence (e.g., a chronological sequence of the conversation and/or the user utterances). That is, conversational flow nodes may be arranged sequentially such that a first conversational flow node may represent a first conversation turn chronologically, a second conversational flow node may represent a second conversation turn chronologically, etc., wherein each conversational flow node may be connected by a conversational flow edge to immediately succeeding and/or immediately preceding conversational flow nodes. In some such embodiments, at least one conversational flow node, such as a first conversational flow node, may be connected by a conversational flow edge to the memory instance root node.

In some embodiments, S220 may include computing one or more statement or utterance embeddings values based on the utterances and/or statements included in the conversational memory input data stored in a conversational flow node. In such embodiments, S220 may implement one or more machine learning algorithms and/or machine learning models (e.g., encoders, transformer models, embeddings models, and/or the like) for computing an embeddings value in an n-dimensional space based on an input of utterances and/or statements from the memory input data. In some such embodiments, the computed embeddings values may optionally be stored in respective conversational flow nodes, such that a conversational flow node may function to store both conversational memory input data utterances or statements and their respective computed embeddings values.

Semantic Memory Nodes

Preferably, S220 may include extracting semantic memory data from (or based on) the collected memory input data to construct one or more semantic memory nodes (semantic nodes). In some embodiments, S220 may extract semantic memory data (sometimes referred to herein as "semantic data elements," "semantic features," or "semantic tokens") from conversational data (e.g., user-input utterances or statements) and/or computed embeddings values stored in conversational flow nodes. In some such embodiments, S220 may implement one or more semantic extraction machine learning models (e.g., encoders, neural networks, and/or the like) to extract semantic memory data from the conversational data or computed embeddings values stored in the conversational flow nodes. In such embodiments, the one or more semantic extraction machine learning models may receive as input the conversational data or the computed embeddings values and may extract one or more semantic data elements from the conversational data or the computed embeddings based on the statements or utterances represented by the conversational data and/or the computed embeddings values.

In one or more preferred embodiments, the extracting of one or more semantic data elements may include identifying a semantic type of an extracted semantic data element. As referred to herein, a semantic type may relate to a type or category of a semantic data element that may be advantageous for describing or characterizing a memory. For example, a conversation data utterance stored in a conversational flow node may include the statement: "I went to the beach"; in such example, the semantic data element "beach" may be identified as a location semantic type, and "I" may be identified as a person semantic type. Semantic types may include, but are not limited to, persons (e.g., "I", "Bob", "my dog", etc.), events (e.g., "birthday", "beach trip", etc.), locations (e.g., "beach", "New York", "home", etc.), dates (e.g., "January 1$^{st}$", "Wednesday", etc.), times (e.g., "midnight", "afternoon", "7:30", etc.), and/or feelings (e.g., "happy", "frustrating", etc.). It shall be noted that a number and/or a definition of distinct semantic types for a system implementing method 200 is extensible, such that the semantic types may include a greater or fewer number of types and/or different types than those noted above. Preferably, the semantic extraction machine learning models may function to perform the identifying of the semantic type of an extracted semantic data element. In some embodiments, the semantic extraction models may function to disregard conversational data elements that may not match the defined semantic types. As a non-limiting example, a conversational data utterance may include the statement: "We went to New York." In such an example, the semantic extraction models may function to disregard the conversational data elements "went to" as not matching a defined semantic type.

Preferably, S220 may function to construct one or more semantic memory nodes that may function as data structures for storing the one or more extracted semantic data element values. In some preferred embodiments, each semantic memory node may function to store a distinct extracted semantic data element value. For example, S220 may function to extract the semantic value "my dog" as a person-type semantic value and "the park" as a location-type semantic value, and accordingly S220 may function to construct a first semantic node for storing the semantic value of "my dog" and a second semantic node for storing the semantic value of "the park." In one or more embodiments, the semantic values stored in the semantic nodes may be stored as characters, strings, statements, and/or utterances or utterance fragments (e.g., "my dog"). Additionally, or alternatively, in some embodiments the semantic values stored in the semantic nodes may be computed embeddings values of the semantic values.

Additionally, in some preferred embodiments, S220 may function to configure or construct one or more graphical semantic edges (semantic edges) that may function to connect the one or more semantic nodes to other nodes in the dynamic memory graph. In some such embodiments, semantic nodes may be connected by semantic edges to the conversational flow nodes from which the semantic values stored in the semantic nodes were extracted. As a non-limiting example, a particular conversational flow node may function to store conversational data utterances including the statement "Jane and I went to Boston." In such an example, semantic data elements "Jane", "I", and "Boston" may be extracted by the one or more semantic extraction models, a semantic node may be constructed for each of the three extracted semantic data elements, and a semantic edge may be constructed connecting each of the three semantic nodes to the particular conversational flow node. Additionally, or alternatively, a semantic edge may be constructed to connect each semantic node to the memory instance root node of the dynamic memory graph.

2.30 Assimilating the Dynamic Memory Graph into a Semantic Nexus

Figure 4:
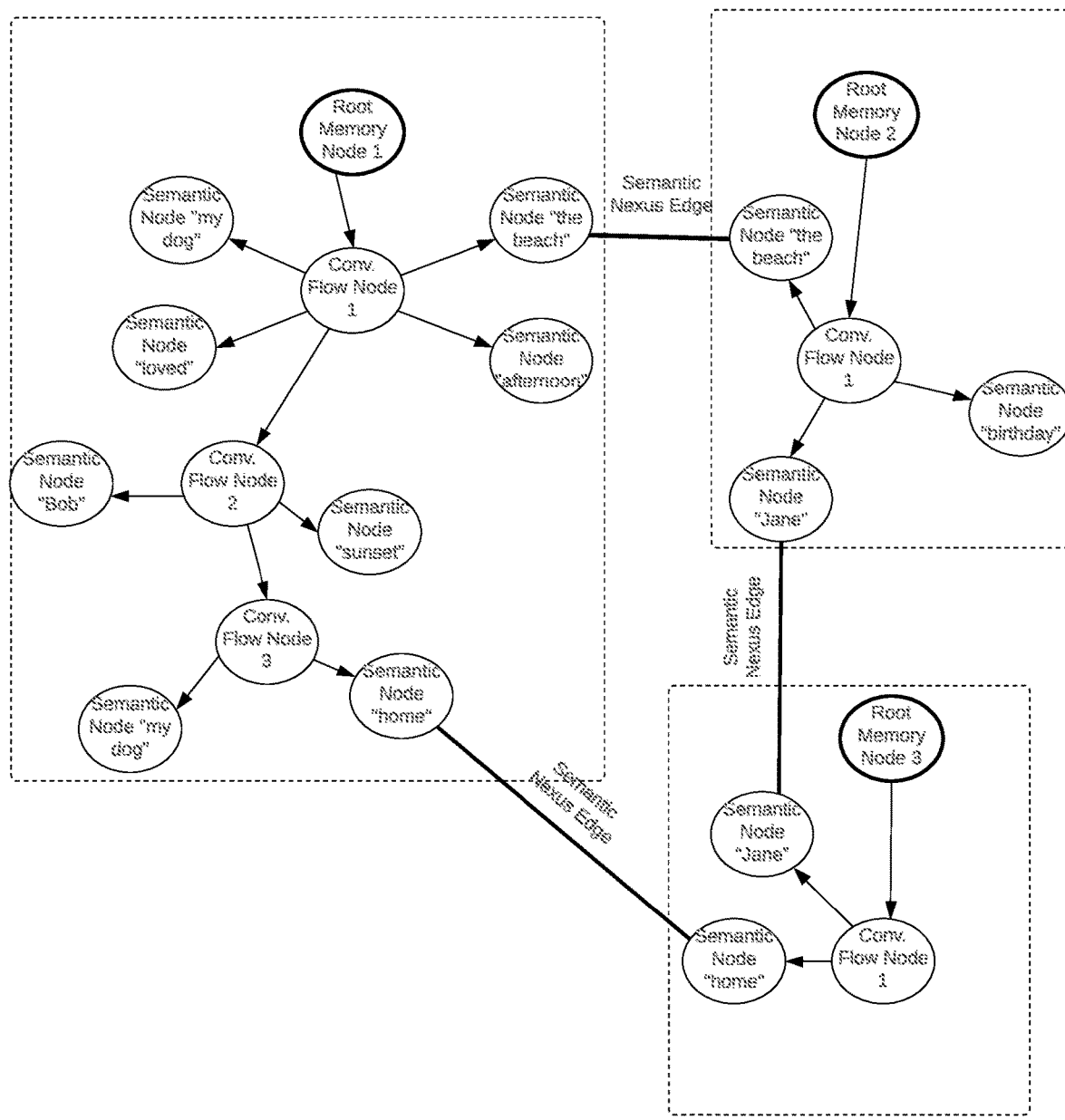
FIG. 4 illustrates a schematic representation of an example semantic nexus with connected memory graphs in accordance with one or more embodiments of the present application.

S230, which includes assimilating the dynamic memory graph into a semantic nexus, may function to assimilate the constructed dynamic memory graph into a semantic nexus including one or more other memory graphs. As generally referred to herein, a semantic nexus may relate to a network of memory graphs that may each be related to a distinct subscriber or user memory. In various embodiments, one or more of the memory graphs of the semantic nexus be connected to one another by one or more graphical edges, as shown for example in FIG. 4. Preferably, memory graphs in the semantic nexus may be connected to one another based on shared or common semantic data in the respective memory graphs. That is, in one or more preferred embodiments, memory graphs that have matching semantic data in the semantic nexus may be connected to one another by one or more graphical edges. It shall be noted that, in some embodiments, one or more of the memory graphs of the semantic nexus may not be connected to other memory graphs of the semantic nexus.

In one or more preferred embodiments, assimilating the dynamic memory graph into the semantic nexus may include configuring and/or constructing semantic nexus graphical edges between one or more semantic nodes of the dynamic memory graph and one or more semantic nodes of other memory graphs in the semantic nexus. A semantic nexus graphical edge (or semantic nexus edge), as generally referred to herein, may relate to a graphical edge or connection between a semantic node of a first memory graph and a semantic node of a second memory graph.

Preferably, S230 may function to connect pairs of semantic nodes in different memory graphs based on a semantic similarity or semantic matching of the semantic data stored in the semantic nodes. In such preferred embodiments, S230 may function to identify a target semantic node of a first dynamic memory graph. In turn, S230 may function to perform a search or traversal of one or more semantic nodes in one or more other memory graphs of the semantic nexus, and/or S230 may function to evaluate and/or compare semantic data element values of one or more semantic nodes in other memory graphs of the semantic nexus relative to the semantic data element values of the target semantic node of the first dynamic memory graph to determine a similarity (e.g., a semantic similarity) or matching between the semantic data element values in the target semantic node and the semantic nodes of the other memory graphs in the semantic nexus.

In one or more embodiments, S230 may function to construct a semantic nexus edge between each pair of the target node and one or more of the other semantic nodes in the other memory graphs if a similarity between the semantic data element values of the target semantic node and the one or more of the other semantic nodes in the other memory graphs meets or exceeds a predetermined similarity threshold, or if a semantic matching criterion is met or fulfilled between the semantic data element values of the target semantic node and the one or more of the other semantic nodes in the other memory graphs. In some such embodiments, the predetermined similarity threshold or matching criterion may require semantically identical semantic data element values (e.g., identical strings, identical textual data, identical utterances, identical embeddings values, and/or the like). Alternatively, the predetermined similarity threshold or matching criterion may require semantically similar, but not necessarily identical, semantic data element values.

In some embodiments, S230 may function to implement a semantic matching model that may comprise one or more machine learning models to determine whether the semantic data element values in two distinct semantic nodes (e.g., semantic nodes in two different memory graphs) meet or exceed a similarity threshold or matching criterion, which may indicate that the two distinct semantic nodes are matching semantic nodes that may relate to similar or identical semantic data that may be connected in the semantic nexus. In some embodiments, the semantic matching model may function to receive, as input, each of the semantic data element values stored in the two distinct semantic nodes, and in turn the semantic matching model may function to determine if the two distinct semantic nodes are related to similar or identical semantic data. In some embodiments, the semantic matching model may function to compute or output a semantic matching score that may relate to a probability, likelihood, or confidence that the two distinct semantic nodes are related to similar or identical semantic data (e.g., a value, percentage, or fraction). In such embodiments, the similarity threshold or matching criterion may relate to a predetermined semantic matching score that must be met or exceeded for S230 to determine that the two distinct semantic nodes are matching (similar or identical) semantic nodes. In some embodiments, the computed semantic matching score may relate to a vector distance or a vector-based similarity measure (e.g., Euclidean distance, cosine similarity, and/or the like) in n-dimensional space between the embeddings of the semantic data elements of the two distinct semantic nodes.

In a non-limiting example, a first dynamic memory graph may be constructed with a first semantic node storing a semantic data element with a value of "my cat". S230 may accordingly function to search the memory graphs of the semantic nexus to identify one or more semantic nodes in other memory graphs which include or store a semantic data element with a value of "my cat." In such an example, a second memory graph may exist in the semantic nexus and may include a second semantic node storing a semantic data element with a value of "my cat." S230 may then function to determine that the semantic data element values of "my cat" in the first and second semantic nodes are identical (i.e., exceeding a similarity threshold or meeting a semantic matching criterion; in this case, identical utterance strings or text values), and S230 may in turn function to construct a semantic nexus edge between the first semantic node in the first dynamic memory graph and the second semantic node in the second memory graph.

In a first preferred implementation, assimilating the dynamic memory graph into the semantic nexus S230, may be concurrent or contemporaneous with constructing the dynamic memory graph S220. In such embodiments, as the dynamic memory graph is constructed, S230 may function to construct one or more semantic nexus edges between semantic nodes of the current dynamic memory graph and semantic nodes of other memory graphs in the semantic nexus. Additionally, or alternatively, S230 may function to be concurrent or contemporaneous relative to collecting conversational memory input data S210. As such, S230 may function to operate in parallel with S220 and/or S210.

In a second preferred implementation, S230 may function to operate asynchronously relative to the constructing of the dynamic memory graph S220. In such embodiments, S230 may function to construct one or more semantic nexus edges between semantic nodes of one or more memory graphs in the semantic nexus after or separate from S230, such that an entire dynamic memory graph is constructed before assimilating the dynamic memory graph into the semantic nexus.

In a third preferred implementation, S230 may function to operate both contemporaneously with S220 and/or S210 as well as asynchronously relative to S220. In such embodiments, S230 may function to first operate contemporaneously with S220 and/or S210 as the dynamic memory graph is constructed, then S230 may function to operate again after the dynamic memory graph is constructed. In some such implementations, S230 may function to assimilate the dynamic memory graph contemporaneously with S220 and/or S210 in a limited operational mode, and S230 may function to assimilate the dynamic memory graph asynchronously in a non-limited operational mode. As generally referred to herein, the limited operational mode of S230 may function to limit the memory graphs of the semantic nexus to be searched and/or evaluated for matching semantic data by S230 based on one or more limiting criteria, and the non-limited operational mode may function to search all memory graphs of the semantic nexus. In such implementations, the one or more limiting criteria may include, but is not limited to: a quantity N of memory graphs and/or semantic nodes to be searched or evaluated (e.g., limit the number of memory graphs searched/evaluated to be below a threshold quantity), graph size limiting criteria (e.g., limit the memory graphs searched/evaluated to memory graphs less than a threshold size), date limiting criteria (e.g., limit the memory graphs searched/evaluated to memory graphs in a particular date range), recency limiting criteria (e.g., limit the memory graphs searched to be the last M constructed memory graphs), and/or any other suitable criteria for limiting the number of memory graphs to be searched and/or evaluated by S230. Advantageously, S230 operating in the limited operational mode may function to conserve computational resources and reduce latency, such that S230 may operate contemporaneously in parallel with S220 and/or S210.

It shall be noted that, in some embodiments, one or more of the memory graphs of the semantic nexus may not be connected to other memory graphs of the semantic nexus. In some embodiments, S230 may function to evaluate the semantic nodes of each of the memory graphs of the semantic nexus without finding matching semantic nodes in the other memory graphs of the semantic nexus; that is, S230 may determine that there are no matching semantic nodes in different memory graphs of the semantic nexus that meet or exceed a similarity threshold or matching criterion. In such instances, S230 may not construct any semantic nexus graphical edges connecting semantic nodes in different memory graphs of the semantic nexus. In such instances, S230 may not construct a semantic nexus graphical edge until a semantic node is added to a memory graph of the semantic nexus (e.g., added during an operation of S220) that S230 may determine is a match (e.g., meets or exceeds a semantic similarity threshold or matching criterion) to another semantic node in another memory graph of the semantic nexus.

2.40 Synthesizing a Mnemonic Narrative

S240, which includes synthesizing a mnemonic narrative based on the semantic nexus, may function to synthesize or construct a mnemonic narrative based on the interconnected memory graphs of the semantic nexus. A mnemonic narrative (sometimes referred to herein as a mnemonic narrative artifact), as generally referred to herein, may relate to a data object that may include data representing or related to a narrative or story of related memories. In one or more embodiments, the narrative or story of related memories represented by the mnemonic narrative artifact may function to inform one or more users or subscribers of a history of related memories, where each related memory may include one or more shared semantic features or elements.

Preferably, the mnemonic narrative may be constructed based on identifying matching semantic data elements from one or more distinct (target) memory graphs, and may include narrative statement data, image data, audio data, and/or the like from each of the one or more distinct memory graphs. In some embodiments, S240 may function to construct a mnemonic narrative based on subscriber or user input. Alternatively, in some embodiments, S240 may function to construct a mnemonic narrative automatically without input from a subscriber or user.

In one or more preferred embodiments, S240 may function to synthesize or construct a mnemonic narrative of target memory graphs based on identifying semantic data stored in one or more distinct (target) memory graphs of the semantic nexus. Preferably, S240 may function to construct the mnemonic narrative based on semantic nexus edges connecting matching semantic nodes in the semantic nexus (semantic nexus edges as described in 2.3). In such preferred embodiments, S240 may function to implement one or more narrative construction algorithms and/or one or more narrative construction machine learning models to construct the mnemonic narrative. In such embodiments, the one or more narrative construction algorithms and/or narrative construction models may function to construct a natural language summary of one or more memories represented by the target memory graphs of the semantic nexus by summarizing natural language data stored in the semantic and conversational nodes of the memory graphs (e.g., by use of a neural network model or transformer model for text summarization to summarize a group of utterances stored in the conversational and semantic nodes). Additionally, or alternatively, in some implementations, synthesizing a mnemonic narrative may include collecting image data, audio data, and/or the like that may be stored in the nodes (e.g., the conversational flow nodes and/or the semantic nodes) of the memory graphs of the semantic nexus. In such implementations, the mnemonic narrative may be constructed and/or modified to include the collected data.

In a non-limiting example, a plurality of semantic nodes in different memory graphs may each include a semantic data element with a value of "the beach" and may be connected to one another by semantic nexus edges (e.g., during an operation of S230). In such an example, S240 may function to construct a mnemonic narrative based on related user memories of the beach stored in memory graphs of the semantic nexus. In such an example, S240 may function to identify one or more target memory graphs associated with user memories of the beach based on identifying each of the memory graphs that contain a semantic node with a semantic data element value of "the beach" (e.g., based on a traversal of the semantic nexus edges connecting semantic nodes including semantic values of "the beach"). In turn, S240 may function to implement one or more narrative construction models or algorithms to collect data from the nodes of each target memory graph which may include and/or be connected to a semantic node including a semantic data element value of "the beach". S240 may in turn synthesize a mnemonic narrative by constructing a textual summary of the collected data (e.g., a natural language textual summary of the memory input data of each target memory graph), and S240 may additionally or alternatively include, in the mnemonic narrative, any collected data (e.g., images, audio clips, utterances, etc.) from each target memory graph.

In some embodiments, S240 may function to construct a mnemonic narrative based on subscriber or user input. In such embodiments, S240 may implement a user interface, (e.g., a graphical user interface (GUI), voice user interface (VUI), and/or the like) to receive user input. In some implementations, a subscriber or user may input or select one or more target semantic values for constructing the mnemonic narrative. For example, a user may input or select a target semantic value "the park" to initialize or direct the construction of a mnemonic narrative based on semantic data elements and values of "the park". Accordingly, in such an example, S240 may function to construct a mnemonic narrative of memories related to "the park" by analyzing the semantic nexus based on semantic data element values including or related to "the park." In such an example, S240 may function to traverse the nodes of one or more memory graphs of the semantic nexus to identify one or more target semantic nodes with semantic data element values matching "the park" as well as any connected (e.g., by a semantic nexus edge) semantic nodes in other memory graphs of the semantic nexus that may include semantic data element values matching "the park". In such an example, S240 may function to identify one or more (or all) memory graphs of the semantic nexus with a target semantic node that may include a semantic data element value matching "the park" as a target memory graph for generating the mnemonic narrative; accordingly, S240 may function to identify each distinct stored user memory that may be related to "the park".

Additionally, or alternatively, in some embodiments S240 may function to construct mnemonic narratives automatically based on identified or targeted semantic values without user or subscriber input. In such embodiments, S240 may function to automatically select one or more target semantic values for constructing mnemonic narratives. In some such embodiments, S240 may function to automatically construct mnemonic narratives asynchronously relative to S210, S220, and/or S230. That is, in some embodiments, S240 may function to automatically construct mnemonic narratives during times when memory input data is not actively being collected or received by one or more users, while one or more memory graphs are not being constructed, and/or while memory graphs are not being assimilated; in such embodiments, such asynchronous operation of S240 relative to S210, S220, and/or S230 may function to conserve computational resources and reduce latency. It shall be noted that, in various embodiments, S240 may additionally or alternatively function to operate concurrently or contemporaneously relative to any or each of S210, S220, and/or S230.

In some preferred embodiments, synthesizing a mnemonic narrative may include constructing a narrative node for storing the synthesized mnemonic narratives. In some such embodiments, S240 may function to modify the memory graph and/or the semantic nexus to include the constructed narrative node. In some such embodiments, S240 may function to add or append one or more (or each) generated mnemonic narrative to the semantic nexus to facilitate further retrievals of the generated mnemonic narrative(s) without the need for regenerating the mnemonic narrative(s).

2.50 Deploying the Mnemonic Narrative

S250, which includes deploying the mnemonic narrative, may function to deploy or output the synthesized mnemonic narrative to one or more subscribers of a system implementing method 200. Preferably, S250 may function to surface or output the synthesized mnemonic narrative to the one or more subscribers via a user interface. Additionally, or alternatively, in some embodiments S250 may function to deploy or output the synthesized mnemonic narrative in a stored narrative format.

In one or more preferred embodiments, S250 may function to implement a user interface to deploy or output the constructed mnemonic narrative to one or more subscribers or users. In such preferred embodiments, S250 may function to implement a user interface (e.g., a graphical user interface (GUI), voice user interface (VUI), and/or the like) that may function to deploy or output the constructed mnemonic narrative, and optionally to receive user input. The user interface may be implemented via any suitable computing device and/or form, including, but not limited to, via a mobile computing device, via a web browser, via a social network interface, via wearable computing devices (e.g., smart watches, smart glasses, and/or the like), virtual and/or personal assistant devices (e.g., Alexa, Amazon Echo, Google Home, Cortana, Jarvis, etc.), and/or the like. In some implementations, the user interface may be the same user interface implemented by S210 to collect user input (described in 2.1). The user interface may function to output any or all data from the constructed mnemonic narrative by providing output in the form of audio, textual data, image data, and/or the like. In some such embodiments, S250 may function to receive user input from the one or more subscribers or users that may indicate or select a constructed mnemonic narrative to be deployed or surfaced.

In one or more embodiments, S250 may function to surface or output the synthesized mnemonic narrative by displaying primary memory images and/or primary memory artifacts associated with each of the target memory graphs represented by the synthesized mnemonic narrative. Additionally, or alternatively, S250 may function to surface or output one or more narrative summaries (e.g., natural language summaries) included in the synthesized mnemonic narrative in a visual format (e.g., text output), audio format (e.g., text-to-speech), and/or any other suitable output format via the user interface. Additionally, or alternatively, S250 may function to surface or output any memory input data included in the synthesized mnemonic narrative to the one or more users via the user interface (e.g., text data, utterance data, audio data, video data, image data, and/or any other data from the memory input data of the target memory graphs of the mnemonic narrative in any suitable data format for output to one or more users via the user interface).

Additionally, or alternatively, S250 may function to deploy or output the synthesized mnemonic narrative in a stored narrative format. In such embodiments, the synthesized mnemonic narrative may be organized and/or stored in a suitable format (e.g., textual, image-based, and/or audio formats) and S250 may function to deploy or output the stored mnemonic narrative to a subscriber or user storage device or system (e.g., a USB drive, hard drive, cloud storage, or the like).

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A computer-implemented method comprising:
   obtaining, via a user interface, memory input data from one or more users, wherein the memory input data comprises a digital media artifact and one or more pieces of memory-descriptive data that is descriptive of a target user-recalled memory associated with the digital media artifact;
   automatically constructing, by one or more processors, a target memory graph based on the memory input data, wherein the target memory graph comprises a plurality of graphical nodes representing a semantic illustration of the memory input data, wherein constructing the target memory graph includes:
   computing a plurality of distinct sets of embedding values based on the memory input data;
   extracting a plurality of distinct semantic features of the memory input data based on an input of the plurality of distinct sets of embedding values to a semantic data extraction model;
   for each of the plurality of distinct semantic features of the memory input data:
   creating a distinct graphical node of the plurality of graphical nodes of the target memory graph;
   storing in association with the distinct graphical node a given semantic feature of the plurality of distinct semantic features and a given set of embedding values of the plurality of distinct sets of embedding values;
   creating, by the one or more processors, a semantic collage using the target memory graph, wherein:
   the semantic collage comprises a plurality of distinct memory graphs interconnected via one or more graphical connections,
   creating the semantic collage includes setting at least one semantic nexus between a node of the target memory graph and a node of a historical memory graph of the semantic collage, the at least one semantic nexus relates to a graphical connection that connects nodes of the target memory graph and the historical memory graph that have an identified semantic relationship, wherein setting the at least one semantic nexus between the node of the target memory graph and the node of the historical memory graph includes:

computing a distance between embedding values of the plurality of graphical nodes of the target memory graph and embedding values of a plurality of graphical nodes of the historical memory graph, determining that a computed distance between the node of the target memory graph and the node of the historical memory graph satisfies or is less than a matching distance threshold, setting the at least one semantic nexus between the node of the target memory graph and the node of the historical memory graph based on the determination, and generating, via a machine learning model, a mnemonic narrative artifact based the semantic collage, wherein the mnemonic narrative comprises a semantic summarization of the semantic collage that is synthesized using data extracted from the semantic collage; and storing, in a queryable computer database, the mnemonic narrative artifact in digital association with the semantic collage and the digital media artifact, wherein if a semantic search of the queryable computer database identifies the semantic collage or the mnemonic narrative artifact, returning via a user interface one or more of the digital media artifact and the mnemonic narrative artifact.

2. The method according to claim 1, wherein creating the semantic collage is performed contemporaneously with constructing the target memory graph.

3. The method according to claim 1, wherein creating the semantic collage is contemporaneous with collecting the memory input data from the one or more users.

4. The method according to claim 1, wherein constructing the target memory graph includes:

extracting one or more sets of one or more tokens from the memory input data;

generating, via the machine learning model, contextual metadata for each distinct set of the one or more sets of one or more tokens based on an input of the one or more sets of one or more tokens;

configuring one or more semantic nodes of the plurality of graphical nodes of the target memory graph based on:
assigning each distinct set of one or more tokens of the one or more sets to each of the one or more semantic nodes, and
appending each contextual metadata for each distinct set of one or more tokens to a respective node of the one or more semantic nodes based on the assignment of each distinct set of one or more tokens.

5. The method according to claim 1, wherein automatically constructing the target memory graph further includes:
(i) extracting one or more semantic data values from the memory input data, wherein each of the one or more semantic data values comprises a value that informs a context of the target user-recalled memory, and
(ii) configuring one or more semantic nodes of the target memory graph based on the one or more semantic data values, wherein each of the one or more semantic nodes comprises one of the one or more extracted semantic data values.

6. The method according to claim 5, wherein assimilating the target memory graph into the semantic collage includes:
(i) identifying one or more pairs of matching semantic nodes, each pair of matching semantic nodes comprising one semantic node from the target memory graph and one semantic node from historical memory graph of the plurality of distinct memory graphs of the semantic collage, wherein the pairs of matching semantic nodes have semantic data values that satisfy a matching criterion for pairing together and graphically connecting the one semantic node from the target memory graph and one semantic node from historical memory graph with the at least one semantic nexus; and
(ii) configuring one or more semantic collage edges linking the semantic nodes in each pair of matching semantic nodes.

7. The method according to claim 5, wherein extracting the one or more semantic data values from the memory input data includes identifying a distinct semantic type for each of the one or more extracted semantic data values.

8. A computer-implemented method comprising:
receiving, via a user interface, one or more memory artifacts from one or more users comprising one or more data objects related to a target user memory, collecting, via a user interface, memory context data from the one or more users, wherein the memory context data comprises one or more utterances associated with the one or more memory artifacts or the target user memory;

automatically constructing a target memory graph based on the one or more memory artifacts and the memory context data, wherein constructing the target memory graph comprises:
computing a plurality of distinct sets of embedding values based on the one or more memory artifacts and the memory context data;
extracting a plurality of distinct semantic features of the one or more memory artifacts and the memory context data based on an input of the plurality of distinct sets of embedding values to a semantic data extraction model;
for each of the plurality of distinct semantic features of the one or more memory artifacts and the memory context data:
(i) creating one or more utterance nodes of the target memory graph for storing semantic features of the memory context data, and
(ii) creating one or more semantic nodes of the target memory graph for storing semantic tokens extracted from the memory context data;
(iii) storing in association with at the least the one or more semantic nodes a given set of embedding values of the plurality of distinct sets of embedding values;

assimilating the target memory graph into a semantic collage comprising a plurality of distinct, interconnected memory graphs, wherein assimilating the target memory graph into the semantic collage includes:
setting at least one semantic nexus between a node of the target memory graph and a node of a historical memory graph of the semantic collage,
the at least one semantic nexus relates to a graphical connection that connects nodes of the target memory graph and the historical memory graph that have an identified semantic relationship, wherein setting the at least one semantic nexus between the node of the target memory graph and the node of the historical memory graph includes:
   computing a distance between embedding values of a plurality of graphical nodes of the target memory graph and embedding values of a plurality of graphical nodes of the historical memory graph,
   determining that a computed distance between the node of the target memory graph and the node of the historical memory graph satisfies or is less than a matching distance threshold,
   setting the at least one semantic nexus between the node of the target memory graph and the node of the historical memory graph based on the determination; and
generating a mnemonic narrative artifact based on one or more of the plurality of distinct memory graphs of the semantic collage, wherein the mnemonic narrative artifact comprises memory context data from each of the one or more of the plurality of distinct memory graphs to represent a history of related user-recalled memories; and
surfacing the mnemonic narrative artifact to the one or more users via the user interface based on input of a request or query from the one or more users.

9. The method according to claim 8, wherein automatically constructing the target memory graph is contemporaneous relative to the collecting of memory context data.

10. The method according to claim 8, wherein configuring the one or more semantic nodes includes:
   providing, as input, one or more user utterances stored in the one or more utterance nodes to a semantic data extraction model,
   receiving, as output from the semantic data extraction model, the one or more semantic tokens extracted from the one or more user utterances input to the semantic extraction model, and
   configuring a semantic node for storing each extracted semantic token.

11. The method according to claim 8, wherein automatically constructing the target memory graph includes configuring one or more semantic edges of the memory graph, wherein each semantic edge links a distinct semantic node to an associated utterance node.

12. The method according to claim 8, wherein assimilating the target memory graph includes automatically searching the semantic collage for one or more matching memory graphs of the plurality of distinct memory graphs of the semantic collage, wherein the one or more matching memory graphs include semantic tokens that match semantic tokens of the target memory graph.

13. The method according to claim 12, wherein:
   (i) assimilating the target memory graph occurs contemporaneously relative to constructing the target memory graph in a limited operational mode, wherein the limited operational mode restricts automatically searching the semantic collage for one or more matching memory graphs to a number N of the plurality of distinct memory graphs of the semantic collage, and
   (ii) assimilating the target memory graph occurs asynchronously relative to constructing the target memory graph in a non-limited operational mode, wherein the non-limited operational mode does not restrict automatically searching the semantic collage for one or more matching memory graphs to a number N of the plurality of distinct memory graphs of the semantic collage.

14. The method according to claim 12, wherein generating the mnemonic narrative includes configuring the mnemonic narrative with natural language textual data generated based on the memory context data from the matching memory graphs and the target memory graph.

15. A computer-implemented system comprising:
   one or more processors;
   a user interface;
   a queryable computer database;
   a computer-readable medium operably coupled to the one or more processors, the computer-readable medium having computer-readable instructions stored thereon that, when executed by the one or more processors, cause a computing device to perform operations comprising:
      obtaining, via the user interface, memory input data from one or more users, wherein the memory input data comprises a digital media artifact and one or more pieces of memory-descriptive data that is descriptive of a target user-recalled memory associated with the digital media artifact;
      automatically constructing a target memory graph based on the memory input data, wherein the target memory graph comprises a plurality of graphical nodes representing a semantic illustration of the memory input data, wherein constructing the target memory graph includes:
      computing a plurality of distinct sets of embedding values based on the memory input data;
      extracting a plurality of distinct semantic features of the memory input data based on an input of the plurality of distinct sets of embedding values to a semantic data extraction model;
      for each of the plurality of distinct semantic features of the memory input data:
         creating a distinct graphical node of the plurality of graphical nodes of the target memory graph;
         storing in association with the distinct graphical node a given semantic feature of the plurality of distinct semantic features and a given set of embedding values of the plurality of distinct sets of embedding values;
      creating, by the one or more processors, a semantic collage using the target memory graph, wherein:
         the semantic collage comprises a plurality of distinct memory graphs interconnected via one or more graphical connections,
         creating the semantic collage includes setting at least one semantic nexus between a node of the target memory graph and a node of a historical memory graph of the semantic collage,
         the at least one semantic nexus relates to a graphical connection that connects nodes of the target memory graph and the historical memory graph that have an identified semantic relationship, wherein setting the at least one semantic nexus between the node of the target memory graph and the node of the historical memory graph includes:
            computing a distance between embedding values of the plurality of graphical nodes of the target memory graph and embedding values of a plurality of graphical nodes of the historical memory graph, determining that a computed distance between the node of the target memory graph and the node of the historical memory graph satisfies or is less than a matching distance threshold, graphically setting the at least one semantic nexus between the node of the target memory graph and the node of the historical memory graph based on the determination, and generating, via a machine learning model, a mnemonic narrative artifact based the semantic collage, wherein the mnemonic narrative comprises a semantic summarization of the semantic collage that is synthesized using data extracted from the semantic collage; and storing, in the queryable computer database, the mnemonic narrative artifact in digital association with the semantic collage and the digital media artifact, wherein if a semantic search of the queryable computer database identifies the semantic collage or the mnemonic narrative artifact, returning via a user interface one or more of the digital media artifact and the mnemonic narrative artifact.

\* \* \* \* \*